Sept. 6, 1949.　　　　　E. T. JOHNSON　　　　　2,481,017
IMPLEMENT CONTROL DEVICE
Filed April 30, 1945　　　　　　　　　　　　　　　2 Sheets-Sheet 1
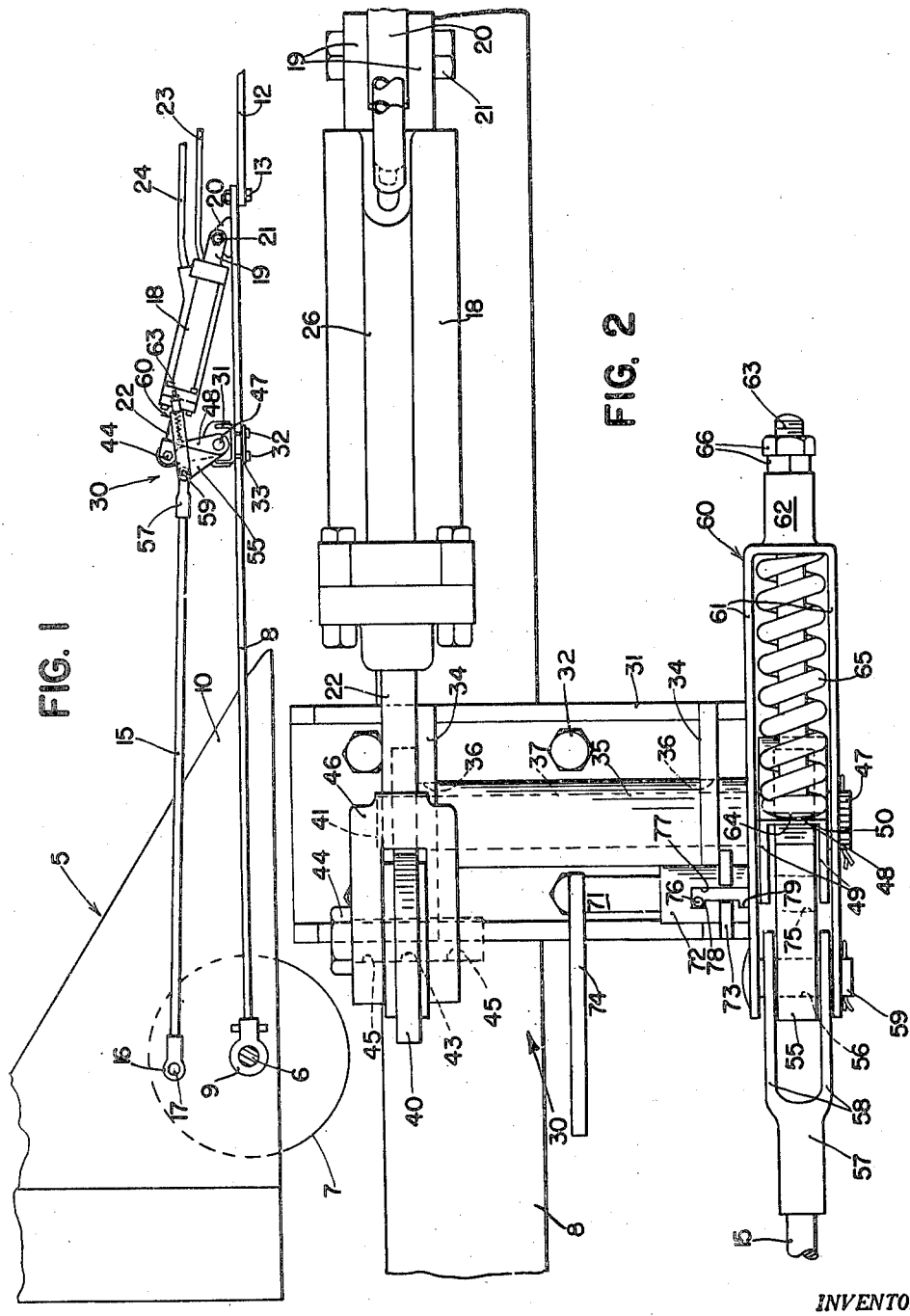
INVENTOR.
ELLSWORTH T. JOHNSON
ATTORNEYS
WITNESS

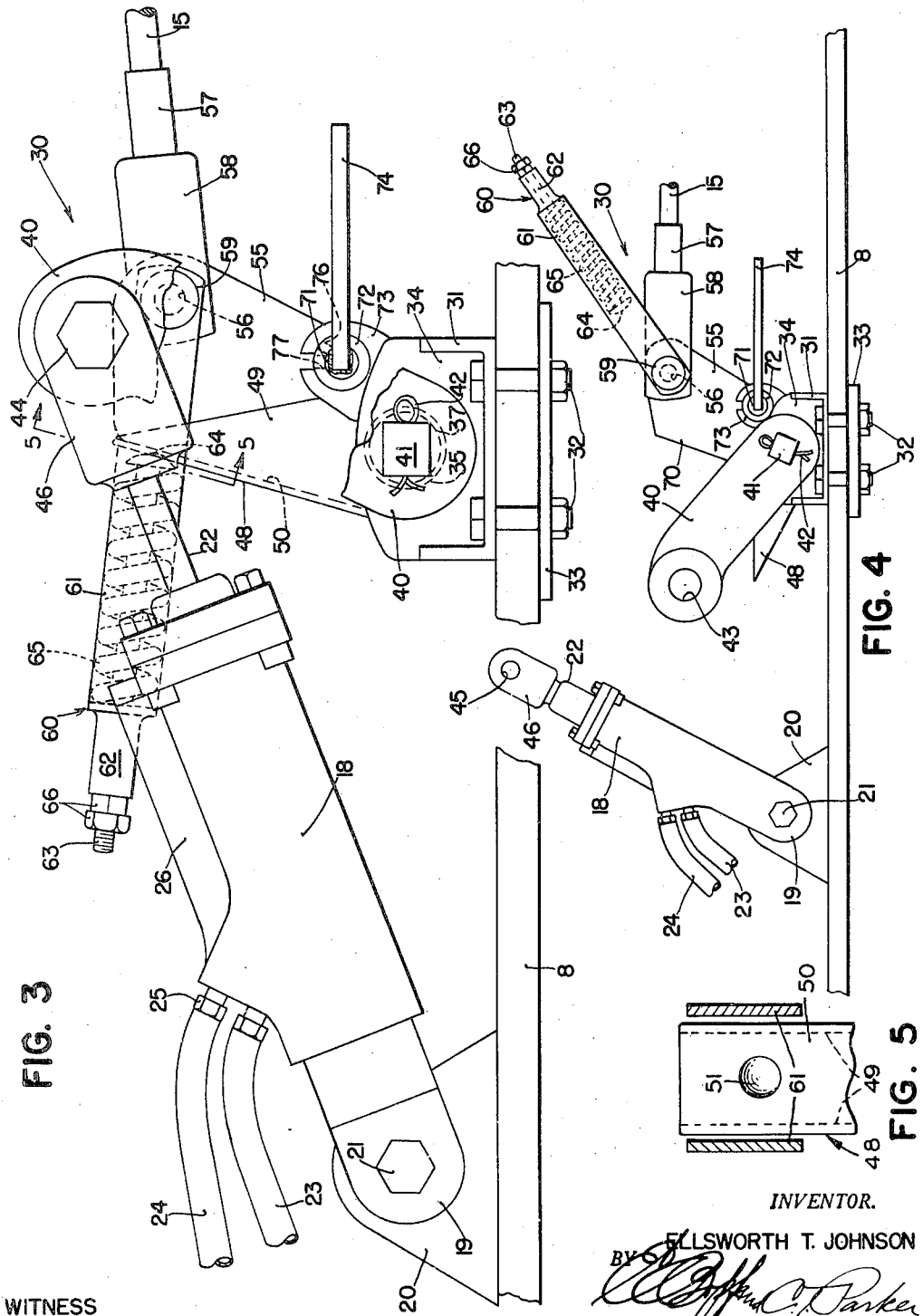

Patented Sept. 6, 1949

2,481,017

UNITED STATES PATENT OFFICE 2,481,017

IMPLEMENT CONTROL DEVICE

Ellsworth T. Johnson, Moline, Ill., assignor to Deere & Company, Moline, Ill., a corporation of Illinois Application April 30, 1945, Serial No. 591,139

16 Claims. (Cl. 56—10)

The present invention relates generally to implement control devices and more particularly to a device for coupling a hydraulic cylinder to an implement for transmitting force from the hydraulic piston to raise and lower the implement, or for other similar purposes.

My invention is most advantageously employed on implements of the type which are towed in trailing relation behind a tractor, and which have parts which must be adjusted frequently during operation by the operator of the tractor. For example, some implements, such as corn harvesters, grain binders, and the like, must be tilted about transverse axes, relative to the draft member, to raise and lower the harvesting mechanism relative to the ground. Some other types of harvesters are provided with platforms which must be raised and lowered to accommodate varying crop conditions, while plows and other ground working tools must be shifted vertically relative to the ground between working and transport positions.

A few years ago, this was generally accomplished by means of hand control levers which extended forwardly along the draft member to a point within reach of the operator of the tractor, which required him to reach back and adjust the levers to adjust the working parts of the implement. More recently, however, these adjustments have been made by hydraulic cylinders mounted on the draft member of the implement and connected to the control levers or other connections, the hydraulic cylinders being under control of the operator by means of suitable control valves on the tractor, connected by flexible hoses to the cylinder on the draft member. When disconnecting a trailing implement of this kind, it is necessary to disconnect the hydraulic cylinder from the draft member and from the control connections, in order to avoid the necessity for disconnecting the flexible hoses from the cylinder with the inherent disadvantages of leakage of the oil or other hydraulic fluid. It is obvious to those skilled in the art, that before the hydraulic cylinder can be disconnected from the control connections, the implement must be in a condition of stability, for it is very difficult to remove a cylinder while it is subjected to stresses set up by virtue of the fact that it is carrying a load. Even though this could be done without too much difficulty, there would be a hazard resulting from the implement or a part thereof dropping to the ground as soon as the supporting cylinder is removed, and therefore one of the principal objects of my invention relates to the provision of a novel and simple but effective device for holding the implement in a stable condition while permitting the hydraulic cylinder to be disconnected and removed from the draft member.

It is evident that this problem would be minimized if every implement could be placed in a stable condition merely by operating the piston to one end of its stroke in the cylinder, thereby lowering the implement to a stable ground engaging position, but this is not always the case. Certain implements, for example, corn binders, are balanced in such a manner that there is some danger of the entire body of the implement tilting backwards on its transverse axis if the hydraulic cylinder were to be removed without first securing the harvester in a safe and stable position.

The problem is further complicated by the fact that if a mere locking means were to be provided to lock the implement rigidly relative to the draft member, there would be considerable inconvenience in attaching a hydraulic piston and cylinder to the lifting connections, for the piston and piston rod would have to be supported by the operator and at the same time adjusted to the exact distance between the cylinder mounting on the draft member and the piston rod connection on the control lever, assuming that the control lever is rigidly locked to hold the implement stable. Thus, in order to insert the securing bolt into the cylinder mounting and the piston rod connection, it would require a considerable adjustment of the hydraulic control valve to set the hydraulic piston at exactly the right position in the cylinder while the operator must support the heavy cylinder with one hand and operate the control valve with his other hand. The distance between the control lever and location of the cylinder makes this operation difficult if not impossible.

Therefore, it is a further object of my invention to provide cylinder connections which can be moved freely to facilitate alignment of the bolt holes, while at the same time holding the implement rigidly in a stable condition, and then with the cylinder completely coupled to its working connection, to provide a simple and easily actuated mechanism for connecting the cylinder connection with the implement connection, after which the locking mechanism can be disconnected.

A still further object relates to the provision of a yielding connection between the cylinder and the adjustable part of the implement, to cushion any shock transmitted therebetween.

These and other objects and advantages of my invention will be apparent to those skilled in the art after a consideration of the following description, in which reference is had to the drawings appended hereto, in which Figure 1 is a side elevational view of a corn harvester provided with a connecting device embodying the principles of our invention.

Figure 2 is a plan view of the connecting device, drawn to an enlarged scale.

Figure 3 is a side elevational view of the device, showing the latter in working position.

Figure 4 is a side elevational view of the device, drawn to a smaller scale, and showing the hydraulic piston and cylinder assembly disconnected from the implement connection.

Figure 5 is a fragmentary sectional view taken along a line 5—5 in Figure 3.

Referring now to the drawings, the implement is indicated in its entirety by reference numeral 5 and is represented diagrammatically as a corn harvester. It is carried on a transverse axle 6, which is supported at opposite ends, respectively, on a pair of ground wheels 7, the near wheel being removed to expose certain connections. The implement 5 is towed by means of a draft member 8, which extends forwardly from the axle 6 and is connected to the latter by means of a journal bearing 9. Thus, the body of the implement 5 is tiltable about the transverse axis of the axle 6 to raise and lower the forwardly extending gatherers, one of which is indicated at 10, in a manner well known to those skilled in the art.

The forward end of the draft member 8 is supported on the drawbar 12 of a tractor and is pivotally coupled thereto by means of a vertical draft bolt 13.

The implement 5 is tilted about the transverse axis of the axle 6 by means of a control rod 15, on the rear end of which is mounted an eye member 16 pivotally connected to the body 5 by means of a pivot bolt 17.

A hydraulic cylinder 18 is provided near the forward end of the draft member 8, the end of the cylinder being provided with a pair of laterally spaced mounting lugs 19, which are pivotally secured to a vertical supporting lug 20 on the draft member 8, by means of a pivot bolt 21. Within the cylinder 18 is slidably disposed a piston (not shown), connected to a piston rod 22. Hydraulic fluid, such as oil, is applied to the mounted end of the cylinder 18 through a flexible hose 23, while a second flexible hose 24 is connected through a hose fitting 25 with a passage 26 extending longitudinally of the cylinder 18 and connected with the outer end of the cylinder to supply oil to that side of the piston. Thus, the piston and cylinder assembly constitutes a double acting hydraulic motor, which can be actuated in opposite directions, selectively, by supplying oil under pressure through either of the flexible hoses 23, 24 to one side of the piston, and conducting oil from the opposite side of the piston through the other of the two hoses in a manner well known to those skilled in the art.

The piston rod 22 is connected to the control rod 15 by means of a control device, indicated in its entirety by reference numeral 30. The control device 30 comprises a channel member support 31 disposed transversely of the draft member 8 and secured by a plurality of vertical bolts 32 to a clamping plate 33 beneath the draft member 8. A pair of laterally spaced vertical plates 34 are rigidly supported between the flanges and bottom of the channel member 31, as by welding, and support therebetween a transverse tubular bearing member 35, which extends through apertures 36 in the plates 34, in which the member 35 is rigidly fixed, as by welding. A rockshaft 37 is journaled within the tubular member 35 and projects laterally out of each end of the tubular member. An arm 40 is mounted on one end of the rockshaft 37, which is reduced in diameter and formed with a square shank 41 at this end to receive the arm 40 which is provided with a square aperture, and is prevented from sliding off the end of the square shank 41 by means of a cotter key 42. The opposite end of the arm 40 is provided with an aperture 43 adapted to receive a pivot pin 44, inserted through aligned apertures 45 in a bifurcated connector or clevis 46 fixed to the outer end of the piston rod 22.

The opposite end of the rockshaft 37 is splined, as indicated at 47, to receive an actuating arm 48, which has a splined aperture to receive the rockshaft in relatively fixed relation. The actuating arm 48 is channel shaped, having a pair of laterally spaced parallel wall portions 49 that are connected by a transverse back wall 50. The side walls or flanges 49 taper toward the outer end of the arm 48, giving the latter a triangular form. The splined end 47 of the rockshaft extends through aligned openings (not shown) in the lower portions of the side flanges 49.

A control lever 55 in the form of a substantially vertical plate is journaled on the splined portion 47 of the rockshaft 37 between the two side flanges or walls 49 of the actuating lever 48. The control lever 55 is not splined but is free to swing on the rockshaft. The control rod 15 is connected to the control lever 55 by means of a forked connector 57, the legs 58 of which straddle the control lever 55 and are apertured to receive a connecting pin 59 which extends through the apertured legs 58 and an aligned aperture 56 in the control lever 55.

A U-shaped stirrup member 60 is provided with a pair of legs 61 which straddle the legs 58, as well as the control lever 55, and are apertured to receive the pivot pin 59. Thus, the connector 57 and the stirrup member 60 are swingable about the axis of the pivot pin 59. The outer end of the U-shaped stirrup 60 is provided with a bearing sleeve 62, rigidly welded thereto, within which is slidably disposed a retaining bolt 63, the head 64 of which is disposed between the sides 61 of the stirrup 60. A helical compression spring 65 is coiled coaxially about the bolt 63 between the head 64 and the outer end of the stirrup 60. A pair of lock nuts 66 engage the threaded end of the bolt 63 at the outer end of the sleeve 62 and serve to hold the bolt 63 and spring 65 within the stirrup 60.

Thus, it is evident that the actuating lever 48 is moved by rocking the rockshaft through the drive arm 40, under control of the hydraulic cylinder 18. The control lever 55, which is journaled on the rockshaft between the two side walls 49 of the actuating lever 48 is provided with a straight edge 70, which bears against the back wall 50 of the actuating lever 48 between the flanges 49. During normal operation of the implement, the two levers 48, 55 are secured together by the stirrup member 60 which extends forwardly embracing the ends of the levers 48, 55, and the head 64 of the bolt 63 bears against the end wall 50 of the actuating lever 48, stressing the spring 65 in compression against the end of the stirrup 60, to hold the bolt head 64 against the lever 48. Thus, the bolt head 64 serves as a latch member securing the two levers 48, 55 together, there being a slight recess or depression 51 in the back wall 50 of the lever 48 to receive the head 64 of the bolt 63. The actuating and control levers 48, 55, can easily be disconnected by swinging the stirrup member 60 upwardly and rearwardly about the pivot bolt 59, thereby sliding the bolt head 64 away from the actuating arm 48.

The control lever 55 can be locked against swinging movement about the axis of the rockshaft 37, by means of a locking pin 71, which is slidably supported within a sleeve 72 fixed to a mounting plate 73, which is welded to one of the supporting plates 34 of the rockshaft sleeve 35. A handle 74 is welded to the outer end of the pin 71, by means of which the pin can be shifted through the sleeve 72 into an aperture 75 in the control lever 55. Thus, when the pin 71 is shifted into the aperture 75, the control lever 55 is locked relative to the support 37 against movement in any direction. The locking pin 71 is provided with a short peg or detent 76 which is secured to the pin 71 substantially perpendicular thereto. The peg 76 projects into a slot 77 in the sleeve 72. The slot 77 extends axially of the sleeve 72 and permits the pin 71 to be shifted axially of the sleeve. The slot 77 has at each end thereof, a short circumferentially extending slot portion 78, 79, into which the peg 76 can be swung by rotating the pin 71 about its major axis. When the pin 71 is in locked position in the aperture 75, the peg 76 is shifted into the slot portion 79, which prevents the locking pin 71 from moving axially out of the aperture 75. The pin 71 is also held in disengaged position by swinging the peg 76 into the outer offset portion 78 of the slot 77, thereby preventing the pin 71 from shifting into locking engagement.

In Figures 1, 2 and 3, the device is shown in normal working position, with the hydraulic cylinder 18 connected to the drive arm 40 and the control rod 15 connected to the control lever 55, the latter being connected to the actuating arm 48 on the rockshaft 37 through the stirrup member 60 and spring actuated bolt 63. It will be noted that when the hydraulic fluid is applied under pressure through the hose 23 the piston and piston rod 22 is moved rearwardly, acting through the rockshaft 37 to shift the control rod 15 rearwardly, thereby swinging the forward ends of the gatherers upwardly to raise the implement away from the ground. In this movement, the force is transmitted directly from the actuating arm through the edge 70 of the control lever 55. However, should the gatherers engage an obstruction on the ground or rise on the contour of the ground, tending to lift the forward end of the implement, the control rod 15 is pulled rearwardly, thereby tending to swing the control lever 55 rearwardly about the axis of the rockshaft 37 away from the actuating arm 48, since the latter is held rigidly against movement in either direction by the double acting hydraulic cylinder 18. This rearward movement of the control lever 55 acts to pull the stirrup member 60 rearwardly, thereby compressing the spring 65 between the actuating lever 48 and the stirrup 60. The spring 65 yields to this pressure thereby preventing damage to the gatherers, and as soon as the obstruction is passed the spring returns the implement to its former position. This same action occurs when the cylinder 18 is actuated in the opposite direction to its extreme position, in which the forward ends of the gatherers bear against the ground. The spring 65 yields to prevent damage to the implement or breakage of the control connections in this case.

When it is desired to disconnect the implement from the tractor drawbar 12, the hydraulic cylinder 18 is actuated to bring the control lever 55 to a position in which the aperture 75 is in register with the locking pin 71, after which the latter can be shifted inwardly to insert the inner end of the pin 71 into the aperture 75. The locking pin 71 now resists any tendency for the implement to tilt forwardly or rearwardly and to release the load thereof from the actuating lever 48. Thus, the stirrup member 60 can now be swung upwardly to disengage the bolt head 64 from the actuating lever 48, thus disconnecting the latter from the control lever 55. This relieves all stress from the connecting pin 44, which may then be removed and the cylinder 18 can be dismounted by removing the anchor bolt 21. After the cylinder 18 is hung upon the tractor, the draft pin 13 can be removed to uncouple the implement from the tractor drawbar 12.

When the implement is reconnected to the tractor, the cylinder is mounted on the drawbar by inserting the bolt 21 through the lugs 19, 20. With the stirrup 60 swung to the position shown in Figure 4, the drive arm 40 and rockshaft 37 are free to swing, facilitating the alignment of the apertures 43, 45 in the arm 40 and their connector 46, respectively. Thus, the pin 44 can be replaced without any stress thereon regardless of the position of the piston within the cylinder. The piston is then moved to shift the rockshaft and actuating arm 48 until the latter abuts against the forward edge 70 of the control lever 55. The stirrup member 60 can now be swung forwardly, forcing the bolt head 64 over the end of the actuating levers 48 into seating relation in a small recess provided therefor. The locking pin 71 can now be withdrawn from the aperture 75 in the control lever 55, whereupon the implement is supported by the hydraulic cylinder, which may now be actuated to control the implement.

Attention is called to the fact that the mounting and dismounting of the cylinder 18 on the drawbar and connecting the piston rod to the arm 40 by the pin 44 are accomplished with no stress in the parts involved, for the arm 40 is free to swing. However, after the cylinder is supported in operating position, it is easily extended or contracted by hydraulic pressure to permit the locking pin 71 to be inserted or withdrawn as the case may be.

I do not intend my invention to be limited to the exact details shown and described herein, except as set forth in the claims which follow.

I claim:

1. Implement control connections comprising a support, a control lever pivotally mounted thereon, a force transmitting member pivotally connected to said lever and adapted to be connected to an implement, an implement actuating lever pivotally mounted on said support adjacent said control lever, and means transmitting a force between said levers comprising a spring support swingably mounted on one of said levers and a compression spring mounted thereon, said support being swingable from a disengaged position to a connected position in which said spring engages the other of said levers and is stressed in compression to transmit force therebetween in one direction but is adapted to yield to an excessive force transmitted therethrough to provide a cushioning action.

2. An implement control device comprising a support, a control lever pivotally mounted on said support, a force transmitting member pivotally connected to said lever and adapted to be connected to an implement, an actuating lever pivotally mounted on said support adjacent to and coaxial with said control lever, and means transmitting a force between said levers comprising a stirrup pivotally mounted on one of said levers and swingable from a disengaged position to a connected position embracing the other of said levers, and a compression type spring disposed between said stirrup and said other lever and stressed therebetween in compression in said connected position.

3. An implement control device comprising a support, a control lever pivotally mounted on said support, a force transmitting member pivotally connected to said lever and adapted to be connected to an implement, an actuating lever pivotally mounted on said support adjacent to and coaxial with said control lever, and means transmitting a force between said levers comprising a stirrup pivotally mounted on one of said levers and swingable from a disengaged position to a connected position embracing the other of said levers, and a compression type spring disposed between said stirrup and said other lever and stressed therebetween in compression in said connected position, and disengageable means for locking said control lever relative to said support for securing said implement when said stirrup is disengaged.

4. An implement control device comprising a support, a rockshaft journaled in said support, a control lever pivotally mounted on said support, a force transmitting member pivotally connected to said lever and adapted to be connected to an implement, an actuating lever fixed to said rockshaft, means transmitting a force between said rockshaft and said control lever comprising a spring support swingably mounted on one of said levers and swingable from a disengaged position into a connected position, a compression spring engaged between said spring support and the other of said levers in said connected position to transmit force through said spring between said levers in one direction by stressing said spring in compression, and a drive arm fixed to said rockshaft.

5. An implement control device comprising a support, a rockshaft journaled in said support, a control lever pivotally mounted on said support and adapted to be connected to an implement, an actuating lever fixed to said rockshaft, means transmitting a force between said rockshaft and said control lever comprising a U-shaped stirrup member swingably mounted on one of said levers and swingable from a disengaged position to a connected position embracing the other of said levers, a compression spring mounted within said stirrup and compressed between the latter and said other lever in said connected position to transmit force through said spring between said levers in one direction by stressing said spring in compression, and a drive arm fixed to said rockshaft.

6. An implement control device comprising a support, a rockshaft journaled in said support, a control lever pivotally mounted on said support and adapted to be connected to an implement, an actuating lever fixed to said rockshaft, means transmitting a force between said rockshaft and said control lever comprising a U-shaped stirrup member swingably mounted on one of said levers and swingable from a disengaged position to a connected position embracing the other of said levers, a compression spring mounted within said stirrup and compressed between the latter and said other lever in said connected position, and a drive arm fixed to said rockshaft, and a locking pin shiftably mounted on said support and adapted to slide into engagement with said control lever to hold the latter against swinging movement when said stirrup is swung to said disengaged position.

7. In combination with an implement draft member, a control device comprising a support fixed to said draft member, a rockshaft journaled in said support transversely of said draft member, a control lever journaled on said rockshaft, a connecting member pivoted on said lever and extending along said draft member for connection with an implement associated with the latter, an actuating lever fixed to said rockshaft adjacent said control lever and adapted to lie against the latter to transmit force thereto in one direction, a spring support mounted on one of said levers and shiftable from a disengaged position to a connected position embracing the other of said levers, a compression spring mounted on said spring support and adapted to be compressed between the latter and said other of said levers in said connected position to transmit force from said actuating lever to said control lever in the opposite direction, providing a yielding connection between said rockshaft and said control lever, a drive arm fixed to said rockshaft, and a hydraulic cylinder and piston assembly mounted on said draft member and connected to said drive arm to rock said rockshaft.

8. In combination with an implement draft member, a control device comprising a support fixed to said draft member, a rockshaft journaled in said support transversely of said draft member, a control lever journaled on said rockshaft, a connecting member pivoted on said lever and extending along said draft member for connection with an implement associated with the latter, an actuating lever fixed to said rockshaft adjacent said control lever and adapted to lie against the latter to transmit force thereto in one direction, a spring support mounted on one of said levers and shiftable from a disengaged position to a connected position embracing the other of said levers, a compression spring mounted on said spring support and adapted to be compressed between the latter and said other of said levers in said connected position to transmit force from said actuating lever to said control lever in the opposite direction, providing a yielding connection between said rockshaft and said control lever, a drive arm fixed to said rockshaft, and a hydraulic cylinder and piston assembly detachably mounted on said draft member and connected to said drive arm to rock said rockshaft, and means for locking said control lever to said support in one position of said control lever, thereby holding said implement connecting member against movement while said spring support is shifted to disengaged position to free said rockshaft for the purpose of attaching or detaching said cylinder and piston assembly relative thereto.

9. In combination, an implement draft member, a hydraulic cylinder and piston assembly detachably mounted thereon, an implement actuating member, and means for detachably connecting said hydraulic assembly to said actuating member comprising a pair of coaxial levers pivotally mounted on said draft member, a connecting element mounted on one of said levers and shiftable into engagement with the other lever to connect said levers together, and means pivotally connecting said levers to said hydraulic assembly and to said implement actuating member, respectively.

10. In combination, an implement draft member, a hydraulic cylinder and piston assembly detachably mounted thereon, an implement actuating member, and means for detachably connecting said hydraulic assembly to said actuating member comprising a pair of coaxial levers pivotally mounted on said draft member, a connecting element mounted on one of said levers and shiftable into engagement with the other lever to connect said levers together, means pivotally connecting said levers to said hydraulic assembly and to said implement actuating member, respectively, and a locking mechanism mounted on said draft member and engageable with said lever which is connected to said implement actuating member for holding the latter against movement while said hydraulic assembly is dismounted.

11. In combination, an implement draft member, a hydraulic cylinder and piston assembly detachably mounted thereon, an implement actuating member, and means for detachably connecting said hydraulic assembly to said actuating member comprising a pair of coaxial levers pivotally mounted on said draft member, means pivotally connecting said levers with said hydraulic assembly and said implement actuating member, respectively, a stirrup pivotally mounted on one of said levers and swingable from a disengaged position to a connected position embracing the other of said levers, and a compression type spring disposed between said stirrup and said other lever and stressed therebetween in compression in said connected position.

12. In combination, an implement draft member, a hydraulic cylinder and piston assembly detachably mounted thereon, an implement actuating member, and means for detachably connecting said hydraulic assembly to said actuating member comprising a pair of coaxial levers pivotally mounted on said draft member, means pivotally connecting said levers with said hydraulic assembly and said implement actuating member, respectively, a stirrup pivotally mounted on one of said levers and swingably from a disengaged position to a connected position embracing the other of said levers, a compression type spring disposed between said stirrup and said other lever and stressed therebetween in compression in said connected position, and a locking mechanism mounted on said draft member and engageable with said lever which is connected to said implement actuating member for holding the latter against movement while said hydraulic assembly is dismounted.

13. In combination with an implement draft member, a control device comprising a support fixed to said draft member, a rockshaft journaled in said support transversely of said draft member, a control lever journaled on said rockshaft, a connecting member pivoted on said lever and extending along said draft member for connection with an implement associated with the latter, an actuating lever fixed to said rockshaft adjacent said control lever and adapted to lie against the latter to transmit force thereto in one direction, a spring support mounted on one of said levers and shiftable from a disengaged position to a connected position embracing the other of said levers, a compression spring mounted on said spring support and adapted to be compressed between the latter and said other of said levers in said connected position to transmit force from said actuating lever to said control lever in the opposite direction, providing a yielding connection between said rockshaft and said control lever, and means for rocking said rockshaft.

14. In combination with an implement draft member, a control device comprising a support fixed to said draft member, a rockshaft journaled in said support transversely of said draft member, a control lever journaled on said rockshaft, a connecting member pivoted on said lever and extending along said draft member for connection with an implement associated with the latter, an actuating lever fixed to said rockshaft adjacent said control lever and adapted to lie against the latter to transmit force thereto in one direction, a spring support mounted on one of said levers and shiftable from a disengaged position to a connected position embracing the other of said levers, a compression spring mounted on said spring support and adapted to be compressed between the latter and said other of said levers in said connected position to transmit force from said actuating lever to said control lever in the opposite direction, providing a yielding connection between said rockshaft and said control lever, a drive arm fixed to said rockshaft, means connected with said arm for rocking said rockshaft, and means mounted on said support for locking said control lever to said support in one position of said control lever to hold said implement connecting member against movement while said spring support is shifted to disengaged position to free said rockshaft.

15. In an implement including a pair of relatively movable parts, a hydraulic cylinder and piston assembly, one end of the latter being detachably mounted on one of said parts, and means for detachably connecting said hydraulic assembly to the other of said parts to provide for shifting said parts by means of said hydraulic assembly, said connecting means comprising a pair of coaxial levers pivotally mounted on said one part, means connecting one of said levers to the opposite end of said hydraulic assembly, means connecting the other of said levers to said other part, detachable means for connecting said levers together, and detachable means for locking said implement parts relative to each other to prevent relative movement, thereby permitting said hydraulic assembly to be removed without affecting said implement parts.

16. The combination set forth in claim 15, including the further provision that said detachable locking means comprises a locking element fixed to said one part and having an aperture therein, said other lever having an aperture adapted to register with the aperture in said element in one position of said lever, and means insertable through said registering apertures.

ELLSWORTH T. JOHNSON.

(References on following page)

REFERENCES CITED

The following references are of record in the file of this patent:

UNITED STATES PATENTS

| Number | Name | Date |
|---|---|---|
| 738,498 | Solberg | Sept. 8, 1903 |
| 1,987,159 | Rasmussen | Jan. 8, 1935 |
| 2,219,477 | Gurries | Oct. 29, 1940 |
| 2,237,719 | Tiebel | Apr. 8, 1941 |
| 2,324,563 | Custenborder | July 20, 1943 |
| 2,375,912 | Gifford et al. | May 15, 1945 |

FOREIGN PATENTS

| Number | Country | Date |
|---|---|---|
| 108,038 | Australia | Aug. 3, 1939 |